United States Patent Office 3,212,731
Patented Oct. 19, 1965

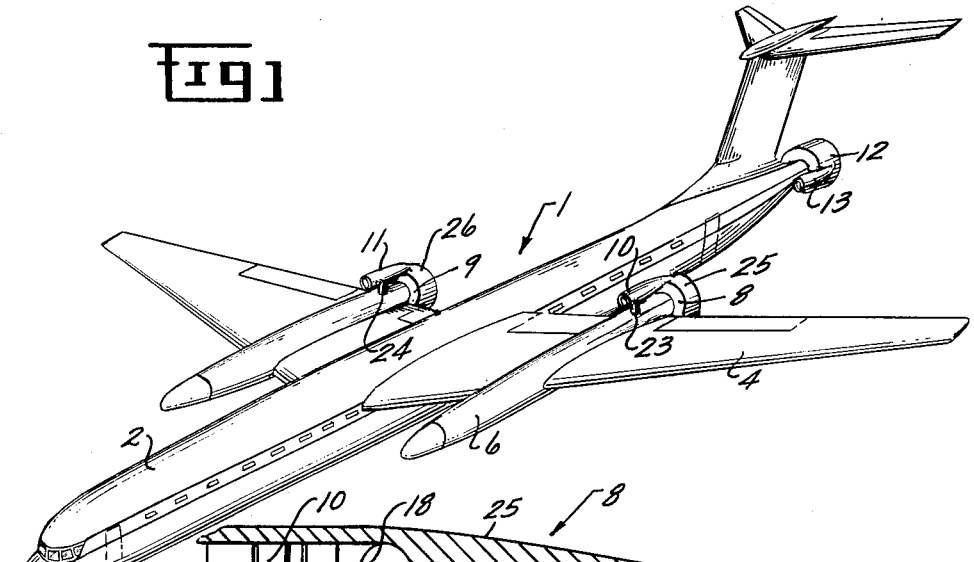
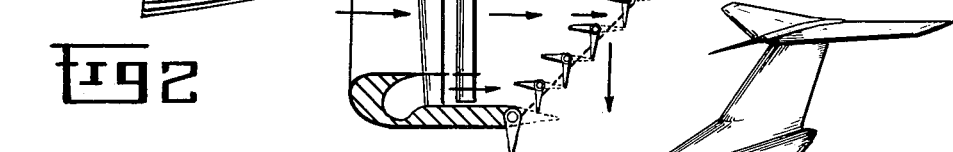
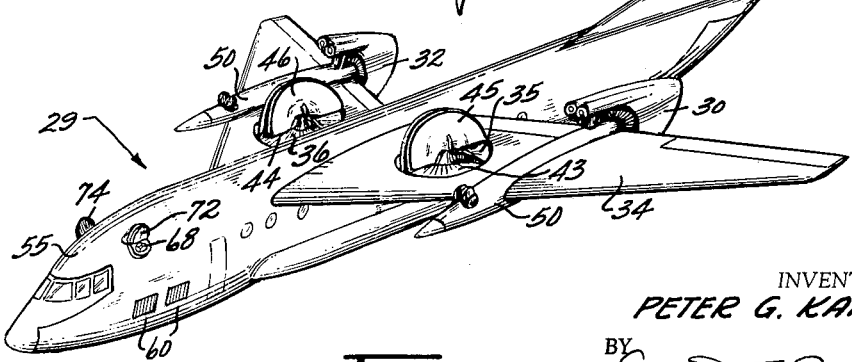

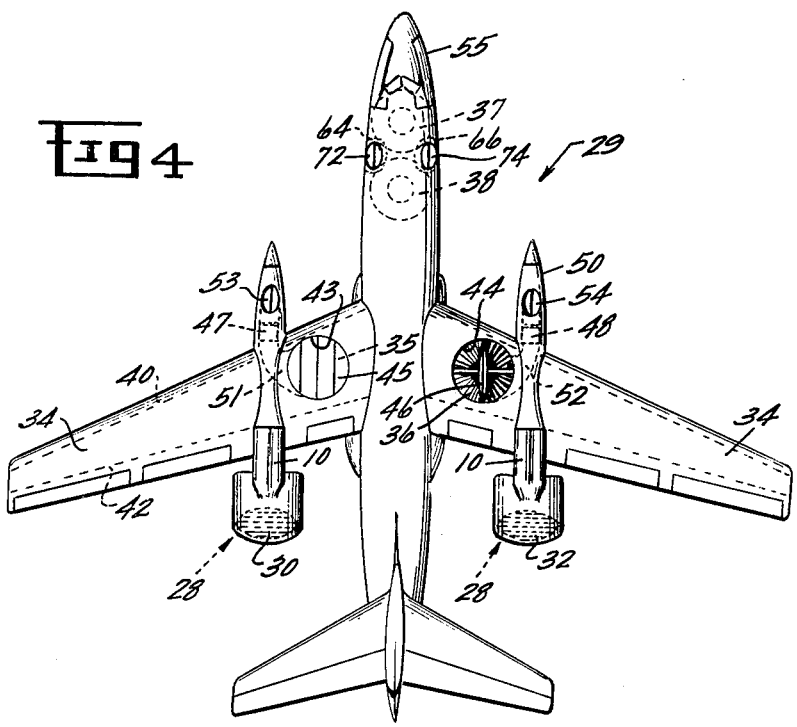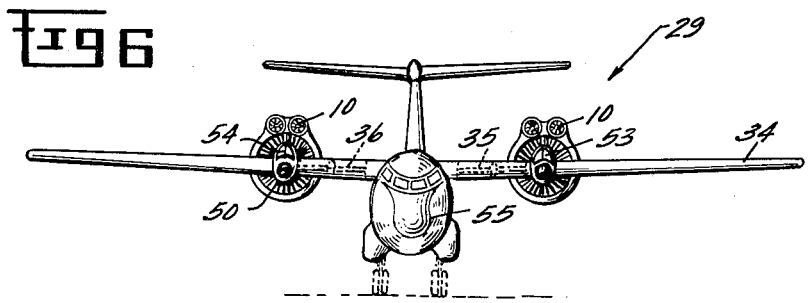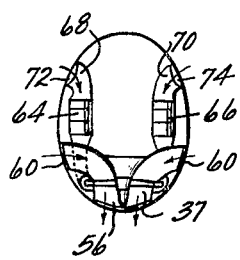

3,212,731
FAN POWERED AIRCRAFT
Peter G. Kappus, Cincinnati, Ohio, assignor to General
Electric Company, a corporation of New York
Filed Sept. 9, 1963, Ser. No. 307,394
9 Claims. (Cl. 244—12)

The present invention relates to fan powered aircraft and, more particularly, to vertical and/or short take-off and landing aircraft which are powered by tip turbine fans.

As might be expected, many problems have arisen with the advent of present-day high-speed aircraft. For example, because of the extremely wide range of flight speeds encountered with high-speed flight, conventional powerplants, which are characterized by narrow speed range limitations, do not efficiently operate throughout the entire range required; i.e., from the take-off to cruise. Propeller air craft are quite efficient in the low-speed range up to 350–450 miles per hour; however, they become very inefficient and even inoperable much above this range. At higher speeds the turbojet is very effective but at take-off and in the low-speed range the available thrust is considerably below that of the propeller aircraft resulting in the requirement of long take-off runs.

The runway lengths demanded by the conventional turbojet aircraft make many areas inaccessible to such aircraft. This disadvantage can be obviated through the use of what is commonly known as V/STOL—vertical/ short take-off and landing—aircraft. However, aircraft having such capabilities are often plagued with inefficient horizontal flight or cruise operation, excessive weight and volume characteristics and complicated and space-consuming gas manifold means coupled with complex valving and control mechanism.

A recent powerplant innovation that provides improved flight performance over a wide range of flight speeds is the powerplant known as the "fan." The basis theory behind the fan is to move large quantities of air through relatively low-pressure ratios to provide high thrust and good propulsive efficiency. A particular fan arrangement known as the tip-turbine fan offers exceptional performance over a wide range of speeds, being superior to turbojet engines at low speeds and superior to propeller engines at high speeds. To date, such a powerplant has been used for providing only vertical propulsion or for providing combined vertical and horizontal propulsion using variable deflector means to vary the thrust direction as desired.

The present invention relates to aircraft employing tip-turbine fans to provide both horizontal and vertical thrust without the need of variable deflector means. Accordingly, it is one object of this invention to provide an aircraft which is highly efficient over a wide range of speeds.

A further object of this invention is to provide a V/STOL aircraft utilizing fan engines and requiring a minimum of gas manifolding.

A still further object of this invention is to provide an aircraft utilizing powerplants which are relatively easy and inexpensive to install on conventional aircraft structure and yet are reliable and light in weight.

Further objects and attendant advantages of this invention will become better understood from the following description and the features of novelty which characterize this invention will be pointed out with particularity in the claims annexed to and forming part of the specification.

Briefly stated, this invention in one form provides a V/STOL aircraft, having conventional fuselage and wing structure, which is powered by tip-turbine fan means. Cruise fans are mounted on a pod behind the trailing edge of the wing in such a manner as to ingest the boundary layer formed thereon during flight, resulting in an increased propulsive efficiency. Each gas generator used for driving these cruise fans is mounted radially disposed from the axis of the fan in order to directly drive the fan and still receive full pressure ram air. A plurality of lift fans are vertically mounted within the wing and within the fuselage nose and are driven by gas generator means. Preferably, the gas generator means are separate and individual for each fan. The gas generators for the wing-mounted fans are horizontally mounted on the forward part of the wing pod adjacent the fans. The gas generators for the nose mounted fans are conveniently mounted vertically in the nose immediately adjacent their respective fans. Such an arrangement minimizes the manifolding needed for driving the tip-turbine fans. Through adjustable louvers mounted on each fan, the thrust direction may be varied from vertical to horizontal, i.e., from lift to cruise.

While the specification concludes with claims particularly pointing out and distinctly claiming the subject matter which is regarded as the invention, it is believed the invention will be better understood from the following description taken in connection with the accompanying drawings in which:

FIG. 1 is a perspective view of a conventional aircraft employing cruise fans embodying the present invention;

FIG. 2 is an enlarged sectional view of a tip-turbine cruise fan formed in accordance with this invention;

FIG. 3 is a perspective view of a V/STOL aircraft embodying the present invention;

FIG. 4 is a plan view of the V/STOL aircraft of FIG. 3;

FIG. 5 is an enlarged partial sectional view of the V/STOL aircraft of FIG. 3 illustrating nose-mounted lift fans;

FIG. 6 is a view of the V/STOL aircraft of FIG. 3.

With reference to the drawings, and in particular FIG. 1, there is shown an aircraft 1 employing a plurality of tip-turbine fan engines formed and mounted in accordance with this invention. The aircraft 1 comprises a fuselage 2 with a wing 4 extending therefrom in the usual manner and, optionally, engine or fuel pods 6 mounted on the wing. A plurality of horizontal flight or cruise fans 8, 9 powered by gas generators 10, 11, respectively, are mounted on the trailing edge of the wing 4, or fuel pods 6, if used, and one cruise fan 12 powered by a gas generator 13 is mounted at the rear end of the fuselage 2.

The fan engines are of the tip-turbine type having the general form as shown in U.S. Patent 3,033,492, assigned to the same assignee of the instant invention. As disclosed therein and shown in FIG. 2, the tip-turbine fan comprises a tip-turbine 14 having turbine buckets 15 mounted on the periphery of fan blades 16 to drive the fan blades for movement of large quantities of relatively low velocity air. The induced increase in mass flow results in a large increase in thrust. The tip-turbine fans are driven by exhaust gases emanating from at least one gas generator 10 disposed immediately forward of and aligned with the tip-turbine 14.

As shown in FIGS. 1 and 3, a single gas generator or a plurality of gas generators may be employed for driving each tip-turbine fan. The exhaust gases from each gas generator are individually ducted directly to the tip-turbine 14 through duct means or manifolds, one manifold 18 being shown in FIG. 2 for one gas generator 10. Because of the location of the gas generator 10 immediately adjacent the tip-turbine 14, the manifolding 18 is kept to a minimum, resulting in simplicity of design and operation and reduction in weight. Additionally, direct drive of the tip-turbine fan is provided, thus dispensing with the usual linkages and gearing often required and, consequently, reducing the weight of the powerplant, an extremely desirable result.

The fans 8, 9 may be mounted on the trailing edge of the wing 4 or pods 6 as best seen in FIG. 2, in such a manner that the inlet for the fan is positioned adjacent the upper and lower surfaces of the wing or pods to ingest the boundary layer air formed on the aerodynamic surfaces during flight. Ingestion of the boundary layer air reduces drag, resulting in an increase of the propulsive efficiency. Additionally, the ingestion of the boundary layer air by the fans partially reduces the need for use of other boundary layer eliminating means, thus simplifying the internal structure of the wing 4. The gas generators 10, 11 are spaced outwardly from the axis of the fans 8, 9 with the gas generator inlets 20 being displaced sufficiently from the wing surface to be beyond the boundary layer and to be non-interfering with the air flow path into the fan inlet, thus allowing the gas generator to ingest full pressure ram air. The gas generators are disposed immediately adjacent the tip-turbines of the fans 8, 9 and are supported at their front end by struts 23, 24 extending from the wing 4 or pods 6 and are supported at their rear end by direct mounting on the housing 25, 26 of the fans 8, 9. It can be seen that such an arrangement of gas generator and fan permits maximum performance by the gas generator and fan with a minimum of manifolding and with no need for diverter or other types of valves.

A similar effect can be obtained with the fan 12 located at the rear end of fuselage 2 by locating a gas generator 13 preferably on both sides of the fuselage as may be seen in FIG. 1, thus permitting the fan to ingest boundary layer air formed on the rear end of the fuselage while the gas generator 13 ingests full pressure ram air.

If desired, as shown in FIG. 2, gas deflection means such as a variable deflecting cascade 28 may be located on the exhaust side of the fan engine to deflect the air exhausting from the fan downwardly resulting in a thrust vector in the vertical direction. Use of such a variable deflector in combination with the aforediscussed cruise fans will provide an improved aircraft with short take-off requirements.

FIGS. 3–6 illustrate another aircraft employing tip-turbine fans formed and mounted in accordance with this invention. The aircraft 29 illustrated therein is a V/STOL aircraft utilizing a plurality of cruise fans 30, 32 mounted on the trailing edge of the aircraft wing 34 and utilizing a plurality of lift fans, two of which 35, 36 are located in the wing roots while another pair 37, 38 are located in the fuselage nose. The cruise fans 30, 32 are formed and mounted in the same manner as discussed above with respect to the form of the invention shown in FIGS. 1 and 2 and further discussion is therefore not required. Similarly, as discussed above, variable diverter means may be used with the cruise fans 30, 32 to increase the vertical thrust capacity of the V/STOL aircraft 29.

The wing-mounted lift fans 35, 36 are mounted in the wing roots between the main spars 40, 42 such that their axes are vertically oriented. The air flow for each of these fans is ingested through inlets 43, 44, respectively, in the upper surface of the wing 34, the air then being propelled downwardly to provide the desired vertical thrust. Closures 45, 46 are provided for a corresponding one of the wing-mounted lift fans 35, 36. During vertical flight, such as on take-off, each closure 45, 46 is moved to its open position as illustrated in FIG. 3 to permit air flow through the lift fans. During horizontal flight or cruise, each closure is extended to its closed position, providing a smooth aerodynamic surface. The closures may be operated by any of the means commonly available in the V/STOL art.

The gas generators 47, 48 used for driving the wing-mounted lift fans 35, 36 are mounted on the leading edge of the wing 34 by placing them in the front end of engine pods or fuel pods 50 mounted chordwise thereon. The gas generators 47, 48 are horizontally mounted, i.e., their axes are parallel to the main axis of the fuselage, and the inlets for the gas generators are equipped with doors which are closed in the cruise mode. The exhaust gases of the gas generators 47, 48 are directed to the scroll manifold of the tip-turbine fans 35, 36 through manifold means 51, 52 which are contained within the wing 34. While a single gas generator is shown driving each lift fan, it is to be understood that a plurality of gas generators could be similarly used to drive each lift fan. If a plurality of gas generators are employed, each gas generator preferably has a separate exhaust manifold leading from the gas generator to the lift fan for driving the fan. As discussed in the aforementioned patent, the use of an individual manifold eliminates the need to match the temperatures, pressures, gas flows, and speed of the gas generators employed to drive a particular fan, thus permitting simplified control of the gas generators and lift fans.

To provide an aerodynamically smooth pod surface during horizontal flight, the inlets for the gas generators 47, 48 are provided with closures or covers 53, 54. The covers are open during employment of the lift fans 35, 36 when vertical thrust is desired and are closed during horizontal flight. Furthermore, the gas generator inlets are provided with debris guards (not shown) to prevent ingestion of foreign matter.

To augment and balance the vertical thrust received from the wing-mounted lift fans 35, 36 and from the vertical component of the cruise fans 30, 32 a pair of lift fans 37, 38 are mounted in the nose 55 of the fuselage. The fans 37, 38 are vertically mounted under the cockpit floor aligned along the longitudinal axis of the fuselage. The air is exhausted through outlets similarly aligned on the underside of the fuselage, one of the outlets being shown at 56 in FIG. 5. Inlet air for the fans 37, 38 is provided through a plurality of louvered inlets 60 located in the side of the fuselage and disposed slightly above the horizontal plane of the nose-mounted lift fans 37, 38, as may be seen in FIGS. 3 and 5. While the inlets 60 are located near the underside of the fuselage and near the outlets 56, the problem of recirculation of exhaust gases back into the inlet 60 is minimized because vertical take-off and landing will almost always be performed while the aircraft is moving forwardly. Additional shielding (not shown) may be provided on the inlets 60 to help prevent recirculation and ingestion of foreign matter.

In order to drive the tip-turbine fans 37, 38 gas generating means 64, 66 are provided, one gas generator for each tip-turbine fan. The gas generators for the nose-mounted lift fans are installed vertically, i.e., their axes are perpendicular to the longitudinal axis of the fuselage. The inlets 68, 70 for the gas generators 64, 66, respectively, are located in the upper surface of the fuselage, thus removing the inlets as far from the ground as possible. Mounting the gas generators 64, 66 vertically immediately adjacent the lift fans 37, 38 minimizes the manifolding required for ducting the gas generator exhaust gases to the lift fans. As with the wing-mounted lift fans, each gas generator has an individual manifold to the particular lift fan which it is driving, thus eliminating the need for diverter valves or other types of valving.

Debris guards (not shown) are provided on the inlet of each of the gas generators to prevent ingestion of foreign matter. Similarly, each of the gas generators employed for driving the lift fans is provided with proper closure means or a cover (shown at 72 and 74) at its inlet to provide a smooth aerodynamic surface during cruising when vertical thrust is not required and, consequently, the lift fans are not being employed.

The aircraft formed in accordance with the modification illustrated in FIGS. 3–6 utilizes four lift fans 35–38, and at least four gas generators 47, 48, 64, 66. Therefore, in the event of engine failure appropriate throttling of the remaining engines will continue to provide the desired vertical thrust thus negating the need for interconnecting manifolding means commonly found in present-day vertical V/STOL aircraft. Vertical thrust is provided either solely by the lift fans 35–38 or by the lift fans in combination with diverted exhaust gases from the cruise fans 30, 32, if proper diversion means is employed thereon. Horizontal thrust is provided solely by the cruise fans 30, 32 which have the advantages thoroughly discussed above with respect to the modification shown in FIGS. 1 and 2. In other words, the configuration shown in FIGS. 3–6 is characterized by using relatively conventional structure of an aircraft fuselage and wing and obtaining vertical take-off and landing capability through the use of lift fans mounted in the wing roots and fuselage nose combined with boundary layer ingesting cruise fans having thrust diverters mounted on the rear end thereof.

It should be understood that while the specific forms of this invention have been shown and described above, it will be apparent to those skilled in the art that numerous changes, combinations, and substitutions of equivalents might be made. It is therefore contemplated by the claims which include the specification to cover all such modifications as forwarded in the true scope and spirit of this invention.

I claim:

1. An aircraft adapted for vertical take-off comprising, a fuselage and a wing extending therefrom, horizontal thrust means including,
a first horizontally oriented tip-turbine fan including a fan having turbine buckets on the tip thereof mounted on said aircraft, the inlet of said first fan being positioned adjacent the surface of said aircraft to ingest boundary layer air formed on said aircraft during flight,
a first gas generator mounted adjacent said first tip-turbine fan and radially spaced from the axis of said first tip-turbine fan, said first gas generator having an air inlet separate from the inlet of said first fan and non-interfering with the air flow path into the inlet of said first fan, the first gas generator inlet being forwardly directed and displaced from said aircraft surface beyond said boundary layer air to ingest full pressure ram air, and
first manifold means connecting the outlet of said first gas generator to the turbine buckets of said first fan to provide direct drive of said first fan by the exhaust gases emanating from said first gas generator, and,
vertical thrust means including,
a second vertically oriented tip-turbine fan including a fan having turbine buckets on the tip thereof mounted on said aircraft,
a second gas generator mounted on said aircraft, and
second manifold means connecting the outlet of said second gas generator to the turbine buckets of said second fan to provide direct drive of said second fan by the exhaust gases emanating from said second gas generator.

2. An aircraft adapted for vertical take-off comprising, a fuselage and a wing extending therefrom, horizontal thrust means including,
a first horizontally oriented tip-turbine fan including a fan having turbine buckets on the tip thereof mounted on the trailing edge of said wing, the inlet of said first fan being positioned adjacent the surface of said wing to ingest boundary layer air formed on said wing during flight,
a first gas generator horizontally mounted adjacent said first tip-turbine fan and radially spaced from the axis of said tip-turbine fan, said first gas generator having an air inlet separate from the inlet of said first tip-turbine fan and non-interfering with the air flow path into the inlet of said first fan, the first gas generator inlet being forwardly directed and displaced from said wing surface beyond said boundary layer air to ingest full pressure ram air and,
first manifold means connecting the outlet of said first gas generator to the turbine buckets of said first fan to provide direct drive of said first fan by the exhaust gases emanating from said first gas generator, and
vertical thrust means including,
a second vertically oriented tip-turbine fan including a fan having turbine buckets on the tip thereof mounted within said wing and having an upwardly directed inlet,
a second gas generator mounted on the leading edge of said wing and,
second manifold means connecting the outlet of said second gas generator to the turbine buckets of said second fan to provide direct drive of said second fan by the exhaust gases emanating from said second generator.

3. An aircraft as defined in claim 2 including a pod mounted chordwise on said wing, said second gas generator being horizontally mounted in the nose of said pod to ingest full pressure ram air and said horizontal thrust means being mounted on the rear end of said pod.

4. An aircraft adapted for vertical take-off comprising, a fuselage and a wing extending therefrom, horizontal thrust means including,
a first horizontally oriented tip-turbine fan including a fan having turbine buckets mounted on the tip thereof mounted on said wing, the inlet of said first fan being positioned adjacent the surface of said wing to ingest boundary layer air formed on said wing during flight,
a first gas generator mounted adjacent said first tip-turbine fan and radially spaced from the axis of said first tip-turbine fan, said first gas generator having an air inlet separate from the inlet of said first tip-turbine fan and non-interfering with the air flow path into the inlet of said first fan, the first gas generator inlet being forwardly directed and displaced from said wing surface beyond said boundary layer air to ingest full pressure ram air, and
first manifold means connecting the outlet of said first gas generator to the turbine buckets of said first fan to provide direct drive of said first fan by the exhaust gases emanating from said first gas generator, and
vertical thrust means including,
a second vertically oriented tip-turbine fan including a fan having turbine buckets mounted on the tip thereof mounted within the nose of said fuselage,
a second gas generator mounted on said aircraft and,
second manifold means connecting the outlet of said second gas generator to the turbine buckets of said second fan to provide direct drive of said second fan by the exhaust gases emanating from said second gas generator.

5. An aircraft as defined in claim 4 wherein air is supplied to said second fan through inlets located in the side of the nose of said aircraft.

6. An aircraft as defined in claim 5 wherein said second gas generator is vertically mounted within the nose of said aircraft adjacent said second tip-turbine fan, the inlet for said second gas generator extending through the upper surface of said nose.

7. An aircraft as defined in claim 6 wherein said vertical thrust means includes,
a third vertically-oriented tip-turbine fan including a fan having turbine buckets mounted on the tip thereof mounted within said wing and having an upwardly directed inlet,
a third gas generator mounted on the leading edge of said wing,
third manifold means connecting the outlet of said third gas generator to the turbine buckets of said third fan to provide direct drive of said third fan by the exhaust gases emanating from said third gas generator.

8. An aircraft as defined in claim 7 including, a pod mounted chordwise on said wing, said third gas generator being horizontally mounted in the nose of said pod and said horizontal thrust means being mounted on the rear end of said pod, and variable deflection means mounted on the downstream side of said first fan to selectively vary the direction of flow of fan exhaust air effecting a variation in thrust direction.

9. An aircraft as defined in claim 8 including, first closure means for said second gas generator inlet mounted on said fuselage nose, second closure means for said third gas generator mounted on said pod and, third closure means for said third fan inlet mounted on said wings, said first, second and third closure means providing a smooth aerodynamic surface when closed during horizontal flight and exposing said second gas generator inlet, said third gas generator inlet, and said third fan inlet, respectively, to the atmosphere when opened during vertical flight.

References Cited by the Examiner

UNITED STATES PATENTS

| | | | |
|---|---|---|---|
| 3,018,034 | 1/62 | Ferri | 244—12 X |
| 3,033,492 | 5/62 | Rowe | 244—23 |
| 3,068,647 | 12/62 | Santamaria. | |
| 3,097,817 | 6/63 | Towzey | 244—15 |
| 3,115,317 | 12/63 | Merrick | 244—12 |

FERGUS S. MIDDLETON, *Primary Examiner.*

RALPH D. BLAKESLEE, *Examiner.*